(12) United States Patent
Brandt et al.

(10) Patent No.: US 11,946,578 B2
(45) Date of Patent: Apr. 2, 2024

(54) TOOTHED WASHER

(71) Applicant: VOSS AUTOMOTIVE GMBH, Wipperfürth (DE)

(72) Inventors: Josef Brandt, Wipperfürth (DE); Frank Engelhard, Wermelskirchen (DE); Markus Waschkewitz, Bergneustadt (DE); Kazim Canpolat, Dormagen (DE); Adrian Klehr, Balve (DE)

(73) Assignee: VOSS Automotive GmbH, Wipperfurth (DE)

( * ) Notice: Subject to any disclaimer, the term of this patent is extended or adjusted under 35 U.S.C. 154(b) by 109 days.

(21) Appl. No.: 17/769,696

(22) PCT Filed: Oct. 14, 2020

(86) PCT No.: PCT/EP2020/078857
§ 371 (c)(1),
(2) Date: Apr. 15, 2022

(87) PCT Pub. No.: WO2021/074199
PCT Pub. Date: Apr. 22, 2021

(65) Prior Publication Data
US 2022/0390053 A1    Dec. 8, 2022

(30) Foreign Application Priority Data
Oct. 16, 2019    (DE) .................... 10 2019 127 857.0

(51) Int. Cl.
*F16L 37/091*    (2006.01)
(52) U.S. Cl.
CPC .................................. *F16L 37/091* (2013.01)
(58) Field of Classification Search
CPC .................................................... F16L 37/091
(Continued)

(56) References Cited

U.S. PATENT DOCUMENTS

| 4,635,975 A | * | 1/1987 | Campbell | ............. F16L 37/091 |
| | | | | 285/423 |
| 5,039,141 A | | 8/1991 | Badoureaux | |

(Continued)

FOREIGN PATENT DOCUMENTS

| CN | 101329001 A | 12/2008 |
| DE | 102013108122 A1 | 7/2014 |

(Continued)

*Primary Examiner* — David Bochna
(74) *Attorney, Agent, or Firm* — Honigman LLP; Eric J. Sosenko; Jonathan P. O'Brien (57) ABSTRACT

A toothed washer, in particular for fixing a tube line introduced in a fluid connector in an insertion direction, including an annular base having a toothed washer central axis. At the inner circumference of the base, cutting teeth are respectively disposed as a single component on the base radially inward and obliquely to the toothed washer central axis and extending in the insertion direction over an overmolded resilient hinge section and an overmolded retaining section connected thereto. The cutting teeth are configured such that in the event of a fixing movement of the tube line, the cutting teeth cut-in against the insertion direction into an outer circumference of the tube line, wherein the cutting teeth include a cutting surface for cutting into the outer circumference of the tube line to be fixed. The cutting teeth have a support surface, and the support surface is configured set back radially outward as viewed from the cutting surface, so that the cutting-in of the respective cutting tooth is limited during a placing of the support surface onto the outer circumference of the tube line. Furthermore, the invention relates to a fluid connector for tube line installation, in particular fluid-guiding tube lines, including a receptacle section for introducing a tube line in an insertion direction, as well as a retaining element, configured as such a toothed washer, disposed in a receptacle section.

17 Claims, 7 Drawing Sheets

(58) Field of Classification Search
USPC .......................................................... 285/340
See application file for complete search history.

(56) References Cited

U.S. PATENT DOCUMENTS

| | | | |
|---|---|---|---|
| 2005/0104367 A1* | 5/2005 | Le Quere | F16L 37/091 |
| | | | 285/18 |
| 2005/0173922 A1 | 8/2005 | Coquard et al. | |
| 2007/0001454 A1 | 1/2007 | Baving et al. | |
| 2014/0183858 A1 | 7/2014 | Hanne | |

FOREIGN PATENT DOCUMENTS

| | | |
|---|---|---|
| EP | 1036970 A2 | 9/2000 |
| JP | 2012077804 A | 4/2012 |
| WO | 2010003315 A1 | 1/2010 |

* cited by examiner

TOOTHED WASHER

BACKGROUND

The invention relates to a toothed washer, in particular for fixing a tube line introduced into a fluid connector in an insertion direction, including an annular base including a toothed washer central axis, wherein on the inner circumference of the base, respectively over an overmolded resilient hinge section, and an overmolded retaining section connecting thereto, cutting teeth are disposed as a single component on the base, radially inward and obliquely to the toothed washer central axis and extending in the insertion direction, wherein the cutting teeth are configured such that in the event of a fixing movement of the tube line against the insertion direction, the cutting teeth cut-in into an outer circumference of the tube line, wherein the cutting teeth include a cutting surface for cutting into the outer circumference of the tube line to be fixed. Furthermore, the invention relates to a fluid connector for tube line assembly, in particular fluid-guiding tube lines, including a receptacle section for introducing a tube line in an insertion direction, as well as a retaining element disposed in the receptacle section.

A connecting disk of the above-described type is known from DE 603 03 013 T2. The connecting disk has specially shaped teeth. The shape of the teeth makes it possible to provide a large contact region between the respective tooth and the tube. The connecting disk further includes gripping peaks, which are formed by a rim of the teeth, which rim is rounded down toward a toothed washer central axis.

From DE 10 2015 122 766 A1, a toothed washer is known that includes material punch-outs in order to thereby increase the resilience of the cutting teeth, and to reduce the insertion forces required during an installing of a tube line. In order that the toothed washer can generate high retaining forces, the cutting teeth have a cutting edge shaped constantly over the cutting-tooth width. Here in order to ensure the function, a wrap angle for the tube line of at least 70%, in particular from 75% to 95%, is preferably to be maintained.

During the installing of the tube line, the tube line is inserted in an insertion direction through the annular base along the toothed washer central axis. Here the cutting teeth of the toothed washer are configured extending obliquely to the toothed washer central axis in the insertion direction. Here in a direction directed away from the toothed washer central axis, the cutting teeth include a cutting angle with the base. Here the cutting teeth are configured extending obliquely to the base in the insertion direction such that the cutting angle is in particular greater than 90° and preferably less than/equal to 180°.

During the inserting of the tube line, the cutting teeth are bent away from the tube line radially from the toothed washer central axis. An installation end position is achieved when the tube line is inserted into the fluid connector up to a maximum. Due to a restoring force of the resilient hinge and a system-pressure load of the tube line, the tube line is displaced in a fixing movement against the original insertion direction, so that the cutting teeth cut into the outer circumference of the tube line. Due to the fixing movement of the tube line in connection with the cutting-in of the cutting teeth, the cutting angle of the cutting teeth increases during the fixing movement, i.e., with increasing fixing movement the cutting teeth constantly tend toward a position perpendicular to the toothed washer central axis. With increasing fixing movement of the tube line, the cutting teeth thereby cut deeper into the tube line.

With the toothed washers known from the prior art, basically two types of failures result. On the one hand, a cutting-off or tearing-off of the tube arises when, in the installed state, the cutting teeth are at too large of a cutting angle due to an uncontrolled fixing movement caused by a too high system pressure or a tensile load of the tube line itself, and thereby cut-in too deeply into the outer circumference of the tube line. In particular, the tube line is thereby weakened such that the tube line can no longer withstand the system pressure or a tensile load on the tube line itself, with the result that the tube line tears off. On the other hand, a stripping off of the tube line results when during the fixing movement and/or in an installed state the cutting teeth are at too shallow of a cutting angle. The result of this is that the tube line is not sufficiently fixed to resist a releasing force, and the outer circumference of the tube line is simply stripped off during the fixing movement, and the tube line assumes no fixed installation position.

SUMMARY

The object of the invention is to provide a toothed washer that overcomes the problems known from the prior art, by in particular improving the cutting-in behavior of the cutting teeth.

The object is inventively achieved by the features of claim 1 by the cutting teeth having a support surface, and the support surface being configured set back radially outward as viewed from the cutting surface, so that the cutting-in of each cutting tooth during a placing of the support surface on the outer circumference of the tube line is limited.

Due to the inventive design, the cutting-in behavior is advantageously improved. The inventive design of the cutting teeth thereby causes that both the cutting angle of the cutting teeth, which increases steadily with increasing fixing movement, and the fixing movement itself are determinable. Thus the cutting-in behavior of the toothed washer of the respective tube line to be installed can be ideally adapted, in particular with respect to its material, diameter, and dimensions. The disadvantages known from the prior art, in particular a cutting-off or tearing-off or peeling-off, are thereby effectively avoided.

In one advantageous embodiment of the invention, the cutting teeth each include at least two teeth on which the cutting surfaces are formed. Here the support surface is respectively preferably formed between the teeth, wherein the cutting surfaces are configured in particular flush with the support surfaces. Particularly preferably in this embodiment the cutting-in of each cutting tooth can be limited in a simple manner. Since the cutting surfaces are configured in particular flush with the support surfaces, and the support surface is simultaneously configured set back radially outward viewed from the cutting surface, a cutting-in depth can be set in a simple manner using the protrusion resulting therefrom of the cutting surface with respect to the support surface. Here the cutting-in depth of each cutting tooth corresponds to the protrusion in an installed and fixed tube line. The placing of the support surface against the outer circumference of the tube line thus limits a further cutting-in and hinders prevents a further fixing movement.

In particular, the cutting surfaces of the cutting teeth each include a cutting upper surface, and the support surface of the cutting teeth respectively includes a supporting upper surface. The cutting surface is respectively calculated per cutting tooth, in particular from a cutting width, which corresponds to the length of the cutting surfaces perpendicular to the toothed washer central axis, multiplied by the cutting thickness, which corresponds to the axial extension of the cutting surfaces with respect to the toothed washer central axis in the region of the cutting surfaces. The support surface is respectively calculated per cutting tooth, in particular from a support width, which corresponds to the length of the support surfaces perpendicular to the toothed washer central axis, multiplied by the support thickness, which corresponds to the axial extension with respect to the toothed washer central axis in the region of the support surfaces.

For the definition of the cutting thickness and support thickness, the axial extension relative to the toothed washer central axis refers to an undeformed state of the toothed washer. The toothed washer is shaped in particular in a press tool, wherein in the undeformed state the cutting teeth are preferably aligned completely flush together with the annular base and the resilient hinge sections lying in a plane perpendicular to the toothed washer central axis. In particular, in the shaping process the toothed washer is merely bent, wherein the cutting thickness and support thickness are preferably maintained after the shaping process in the press tool.

In particular, the cutting surfaces and/or the support surfaces are each configured as pitch circle segments bend around a center point, and preferably the center points are respectively oriented with respect to the toothed washer central axis, wherein in particular the central points of the pitch circle segments, preferably in the undeformed state of the toothed washer, lie in the toothed washer central axis. The arc length of the cutting surface about the respective pitch-circle-segment center point is advantageously used for the cutting width. Accordingly in particular the arc length of the support surface about the respective pitch-circle-segment center point is used for the support surface.

According to one embodiment, the cutting surfaces, as described, each have the cutting thickness that corresponds to the axial extension of the cutting surfaces with respect to the toothed washer central axis in the region of the cutting surfaces, and the support surfaces each have the support thickness that corresponds to the axial extension with respect to the toothed washer central axis in the region of the support surfaces, wherein the support thickness of the support surface is preferably at least partially greater than the cutting thickness of the cutting surface. According to a particularly preferred embodiment, the support thickness of the support surface is in particular at least partially twice as great as the cutting thickness of the cutting surface. The enlarged support thickness enlarges the support surface such that with the placement of the support surface against the outer circumference of the tube line, the cutting-in of the respective cutting tooth is made significantly more difficult than with a support surface only set back radially with respect to the toothed washer central axis from the cutting surface.

For a preferred cutting-in behavior, each cutting tooth has a ratio of a sum of the cutting upper surfaces of the cutting surfaces to a sum of the support upper surfaces of the support surfaces that falls in a range from 0.8 to 1.2, in particular 0.9 to 1.1, preferably corresponding to 1.

In a further embodiment of the invention, in particular the support surface is respectively disposed between the cutting tooth and the retaining section connected as a single component to the cutting tooth and the retaining section. Here the support surface is preferably connected to the retaining surface with a first bending in the hinge section and to the cutting tooth with a second bending. In particular, here in a direction directed away from the toothed washer central axis, the support surface includes a support angle with the base that is preferably smaller than a bending angle that the retaining section includes in the direction directed away from the toothed washer central axis with the base. In particular, here in the direction directed away from the toothed washer central axis, the cutting tooth includes a cutting angle with the base wherein the cutting angle is preferably greater than the support angle.

In this embodiment the design of the bending angle establishes in particular a lever for the retaining section. Depending on the smallest spacing of the retaining section radially with respect to the toothed washer central axis, as well as the bending angle itself, a contacting is set between the support surface and the outer circumference of the tube line.

The bending angle is preferably chosen such that in a not-installed state it falls in a range between less than/equal to 175° and greater than/equal to 135°, since starting at an angle greater than 175°, during the fixing movement of the to-be-installed tube line against the insertion direction, the cutting teeth would envelop axially with respect to the toothed washer central axis and would cut through the tube line. On the other hand, with a bending angle smaller than 135°, the radial clamping force would be too small, and would result in a peeling-off of the tube line to be installed.

Using this advantageous embodiment, the tube line is secured on the outer circumference in particular at two positions axially offset with respect to the toothed washer central axis. The toothed washer preferably generates a friction-interference fit due to the cutting-in of the cutting surfaces in a cutting-in plane in the outer circumference of the tube line. Furthermore, due to the advantageous angling of the individual sections during the fixing movement and the tendency thereby arising of the cutting tooth to enlarge the cutting angle, a contacting, oriented radially with respect to the toothed washer central axis, arises between the support surface and the outer circumference of the tube. This friction fit is effected in particular over the circumference of the outer tube evenly distributed in a press plane oriented axially offset from the cutting-in plane with respect to the toothed washer central axis in the direction of the fixing movement, and parallel to the cutting-in plane.

Furthermore, due to such an embodiment, using the support surface the cutting-in behavior is synergetically improved, since the cutting-in is limited in a to-be-fixed tube line during the fixing movement by the placing of the support surface on the outer circumference of the tube line, and simultaneously due to the deforming of the cutting tooth during the fixing movement, the support surface is pressed radially against the outer circumference and additionally secures the position of the tube line relative to the toothed washer with a friction fit.

The toothed washer is preferably shaped in a press tool, wherein in an undeformed state of the toothed washer the cutting surfaces have an initial inner circumference that is smaller than an inner circumference of the tube line to be fixed. The bending angle of the fully shaped toothed washer as well as the lengths of the support surface, of the cutting tooth, and of the retaining section are preferably chosen such that—under the assumption that the support surface and the cutting tooth are respectively connected to the retaining section in a straight line with the retaining section—the cutting surfaces of the cutting teeth lie in an inner intermediate circumference that would lead to a cutting-off or tearing-off of the tube line, in particular under a system pressure load.

Furthermore, the object underlying the invention is achieved by a fluid connector for tube line installation, in particular fluid-guiding tube lines, including a receptacle section for introducing a tube line in an insertion direction, as well as a retaining element disposed in the receptacle section, by the retaining element being configured as a toothed washer having the features according to one of claims 1 to 8.

Further advantageous designs of the invention arise from the following Figure description and the dependent subclaims.

BRIEF DESCRIPTION OF THE DRAWINGS

In the various Figures of the drawings identical parts are always provided with the same reference numbers.

DETAILED DESCRIPTION

For the subsequent description it is stressed that the invention is not limited to the exemplary embodiments and here not to all or a plurality of features of described feature combinations, but rather each individual partial feature of the/each exemplary embodiment is also of significance for the subject matter of the invention released from all other partial features described in this connection and also in combination with any other features of another exemplary embodiment.

Figure 15:
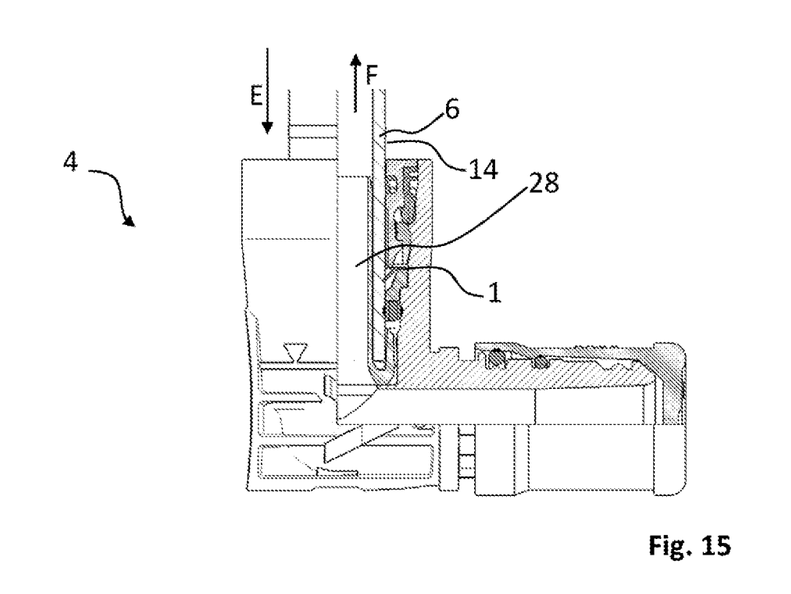

In FIGS. 1, 7, 9a and 9b, a toothed washer 1 is depicted including an annular base 2 having a toothed washer central axis X. Such toothed washers 1 preferably serve for a fixing of a tube line 6 introduced in a fluid connector 4 in an insertion direction E depicted in FIGS. 2, 8 and 10. The fluid connector 4 with introduced tube line 6 is depicted in FIG. 15.

As depicted in FIGS. 1, 7, 9a and 9b, cutting teeth 12 are disposed as a single component on the base 2, radially inward and obliquely to the toothed washer central axis X, each over an overmolded resilient hinge section 8 and an overmolded retaining section 10 connected thereto, wherein the cutting teeth 12 extend in the insertion direction E.

Furthermore, the cutting teeth 12 are configured such that during a fixing movement F of the tube line 6, as depicted in FIGS. 3a to 6a and 11 to 14, the cutting teeth 12 cut-in against the insertion direction E into an outer circumference 14 of the tube line 6. For this purpose the cutting teeth 12 have a cutting surface 16 for cutting-in in into the outer circumference 14 of the tube line 6 to be fixed.

Figure 2:
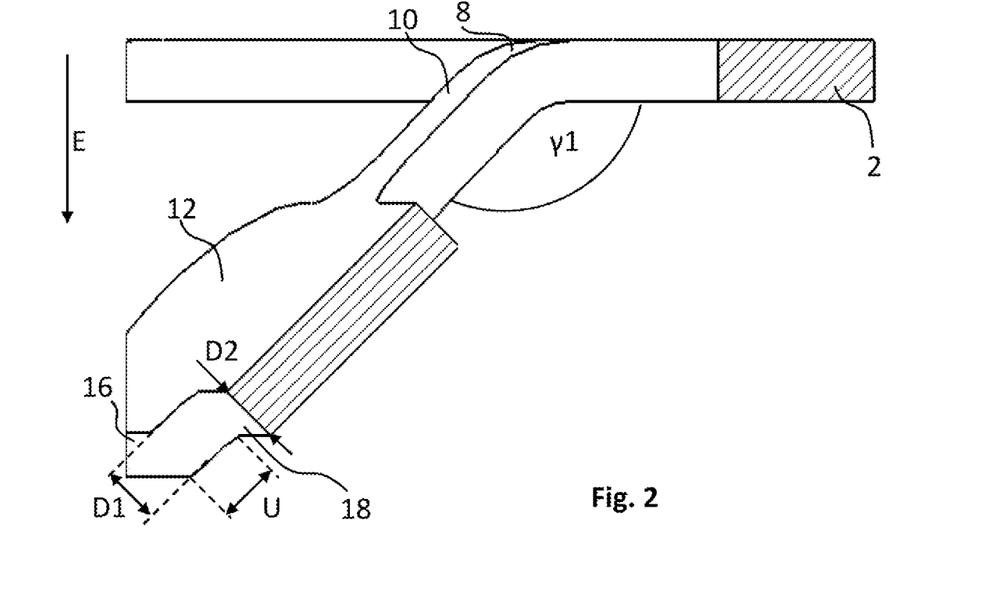
FIG. 2 shows a sectional view of the toothed washer 1 from FIG. 1 along A-A according to FIG. 1, FIGS. 3 to 6 show an installation sequence of a tube line 6 including the toothed washer 1 from FIG. 1 respectively in two sectional views along A-A and B-B according to FIG. 1.
Figure 8:
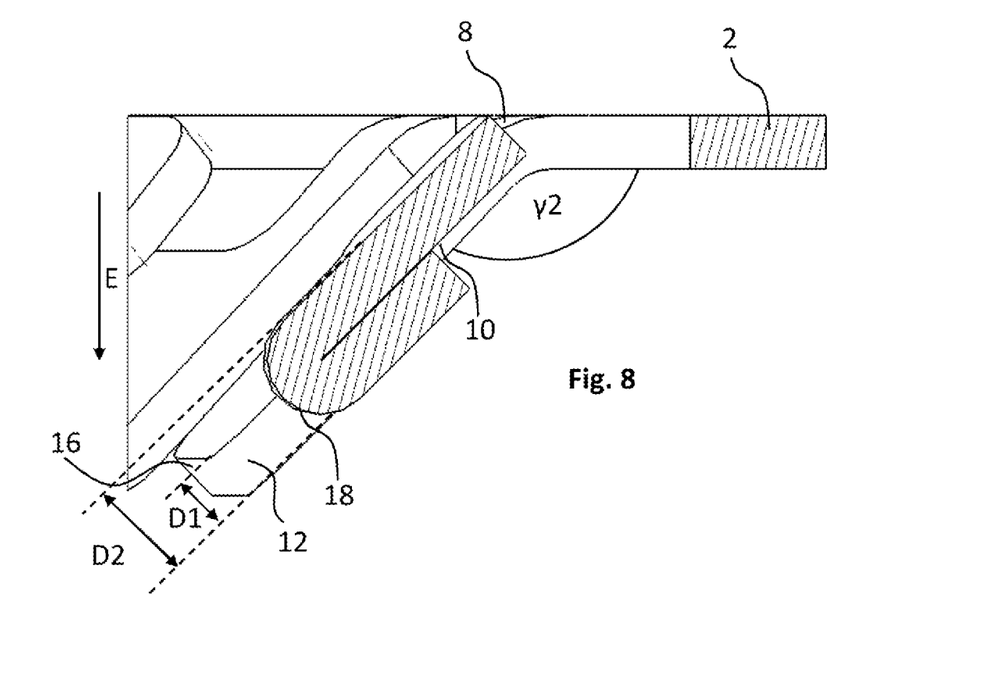
FIG. 8 shows a sectional view of the toothed washer 1 from FIG. 7 along C-C according to FIG. 7.
Figure 10:
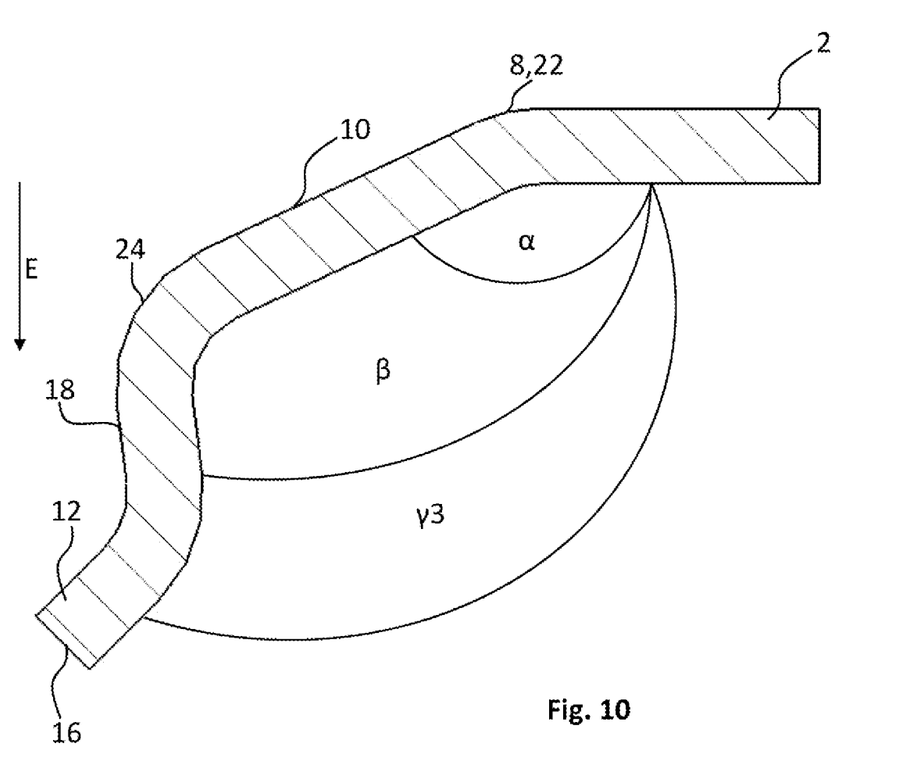
FIG. 10 shows a sectional view of the toothed washer 1 from FIG. 9a along D-D according to FIG. 9a, FIGS. 11 to 14 show an installation sequence of a tube line 6 including the toothed washer 1 from FIG. 9a respectively along D-D according to FIG. 9a, and FIG. 15 shows a sectional view of an inventive fluid connector along the flow course of a fluid to be flowed through the fluid connector.

In particular, as depicted in FIGS. 2, 8 and 10, in the region of the cutting surfaces 16, the cutting teeth 12 include a cutting angle γ1, γ2, γ3 with the base 2 in the direction pointed away from the toothed washer central axis X. This cutting angle γ1, γ2, γ3, see FIGS. 2, 8 and 10, is in particular 120° to 150°, preferably 130° to 140°.

The cutting teeth 12 are preferably uniformly distributed over the circumference of the annular base 2. Here the cutting teeth 12 each form a wrap angle with their cutting surfaces 16, i.e., an angle section, wherein the respective cutting tooth 12 cuts into the outer circumference 14 of the tube line 6 to be fixed. According to one advantageous embodiment, the cutting teeth 12 together have a circumferential wrapping angle of at least 70%, in particular from 75% to 95% of the circumference of the tube line 6.

In the sectional views of FIGS. 2, 8 and 10, it is depicted that the cutting teeth 12 inventively have a support surface 18, and viewed from the cutting surface 16, the support surface 18 is configured set back radially outward as viewed from the toothed washer central axis X outward. According to the invention the cutting-in of the respective cutting tooth 12 is thereby limited during a placing of the support surface 18 on the outer circumference 14 of the tube line 6.

Due to the inventive embodiment, the cutting-in behavior is advantageously improved. The inventive design of the cutting teeth 12 thereby causes that both the cutting angle γ1, γ2, γ3 of the cutting teeth 12, which increases steadily with increasing fixing movement F, and the fixing movement F itself are determinable. This has the consequence that the penetration depth of the cutting teeth 12 into the tube line 6 is limited, and a cutting-in angle that includes the cutting teeth 12 with the outer circumference 14 of the tube line 6 can be set. A peeling-off or a cutting-off or tearing-off during the fixing of a tube line 6 is thereby prevented in an effective manner. According to the invention the cutting-in behavior of the toothed washer 1 can thus be ideally adapted to the respective tube line 6 to be installed, in particular with respect to their material, diameter, and dimensions.

The cutting surfaces 16 and/or the support surfaces 18 are preferably each configured as pitch-circle segments 20 bent about a center point. Here the center points are in particular each oriented with respect to the toothed washer central axis X, wherein preferably the central points of the pitch-circle segments 20, preferably in the undeformed state of the toothed washer, lie in the toothed washer central axis X. This advantageous embodiment is depicted in particular in FIGS. 1, 9a and 9b. Due to the pitch-circle segment design, a uniform cutting-in is advantageously achieved.

Figure 1:
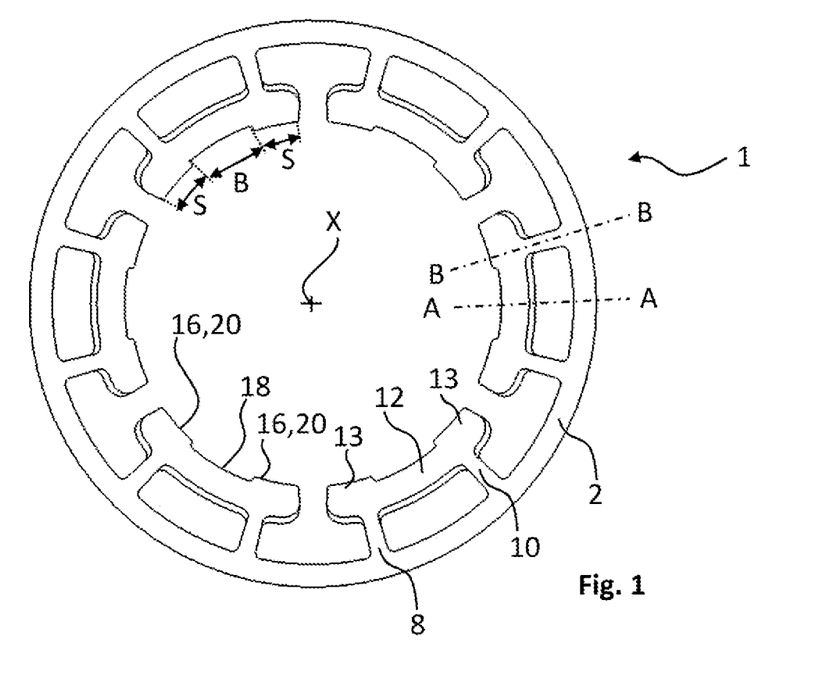
FIG. 1 shows a plan view of an inventive embodiment of a toothed washer 1.
Figure 7:
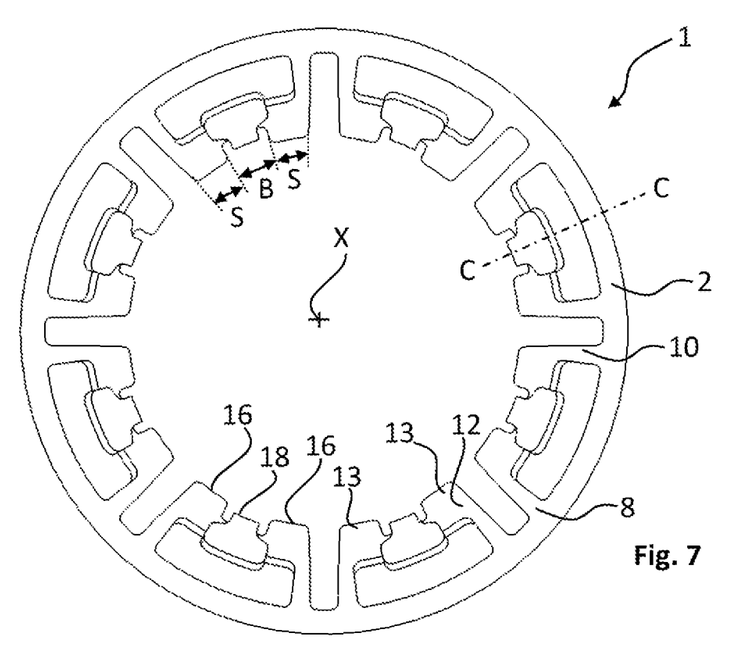
FIG. 7 shows a plan view of a further inventive embodiment of a toothed washer 1.

Two advantageous embodiments of the toothed washer 1 are depicted in FIGS. 1 and 7. According to this embodiment, the cutting teeth 12 in particular each have at least two teeth 13. On these teeth 13 the cutting surface 16 is configured, wherein the support surface 18 is preferably formed between the teeth 13 in each instance. Here the cutting surfaces 16 of these embodiments are preferably each configured flush with the support surfaces 18.

Particularly advantageously according to this embodiment, as the installation sequence in FIGS. 3 to 6 shows in particular, the cutting-in of the respective cutting tooth 12 is limited. Since the cutting surfaces 16 are configured in particular flush with the support surfaces 18, and the support surfaces 18 are simultaneously configured set back from the cutting surface 16 as viewed radially outward from the cutting surface 16, a cutting-in depth can be set in a simple manner using a protrusion U resulting therefrom of the cutting surface 16 with respect to the support surface 18. The protrusion U is depicted in FIG. 2. Here the cutting-in depth of the respective cutting tooth 12 preferably corresponds to the protrusion U. However, it can also be provided that the support surfaces 18 also penetrate into the outer circumference 14 of the tube line 6 to be installed, in order to increase the wrap angle and to effect an additional axial fixing of the tube line 6. The placing of the support surface 18 against the outer circumference 14 of the tube line 6 thus limits a further cutting-in and hinders prevents a further fixing movement F.

The support surface 18 is advantageously blunt, in particular the support surface is stamped blunt in the manufacturing process, so that it can cut-in less or only slightly into the outer circumference 14 of the tube line 6 to be installed.

The installation sequence depicted in FIGS. 3a to 6b shows the toothed washer 1 according to the advantageous embodiment of FIG. 1. This installation sequence is furthermore completely transferable to the toothed washer 1 according to the alternative embodiment of FIG. 7. Here the respective state according to the sectional line B-B from FIG. 1 is depicted in FIGS. 3a, 4a, 5a, and 6a. Accordingly the respective state according to the sectional line A-A from FIG. 1 is depicted in FIGS. 3b, 4b, 5b, and 6b.

Figure 3A:
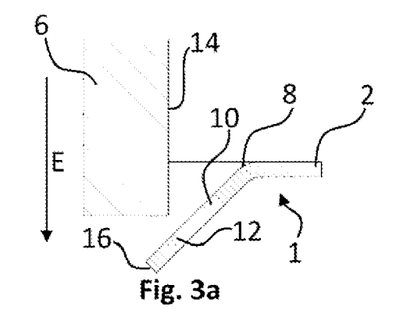
Figure 3B:
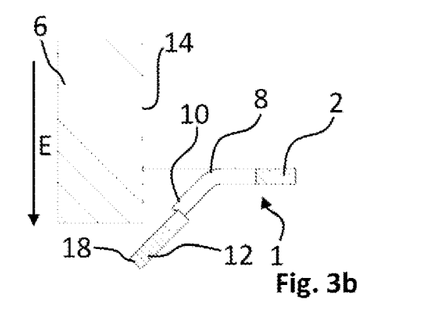

Here in FIGS. 3a and 3b, the toothed washer 1 is depicted in a state without any contact with the tube line 6 to be installed. In this state the toothed washer 1 has a cutting angle of 120° to 150°, preferably 130° to 140°, wherein the cutting surfaces 16 of the cutting teeth 12 are disposed in an inner circular path that has a smaller diameter than the outer circumference 14 of the tube line 6 to be installed.

Figure 4A:
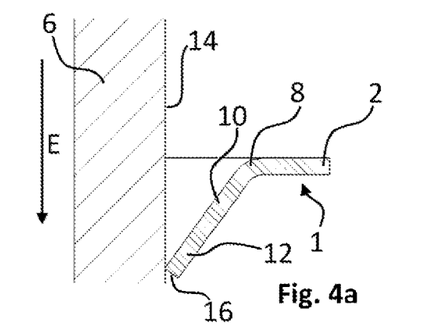
Figure 4B:
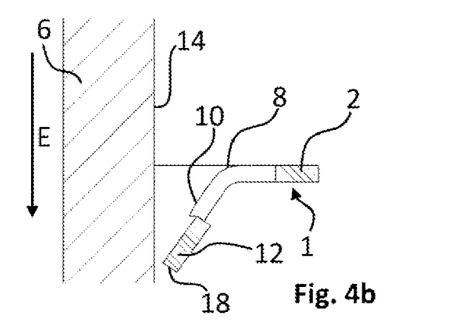

In FIGS. 4a and 4b, the tube line 6 is passed against the cutting surfaces 16 in insertion direction E, whereby the cutting teeth 12 have been pressed outward radially from the toothed washer central axis X, and the cutting angle γ1, γ2 has thereby decreased.

Figure 5A:
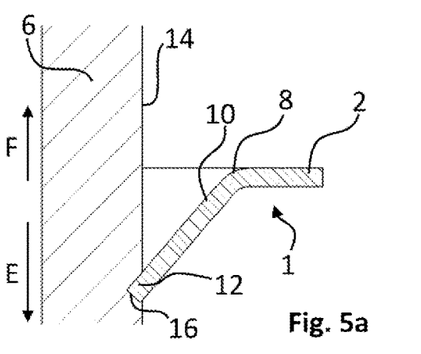
Figure 5B:
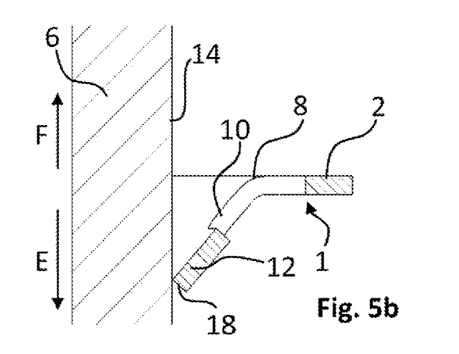

According to the state depicted in FIGS. 5a and 5b, the tube line 6 has been moved by a fixing movement F from the state depicted in FIGS. 4a and 4b against the insertion direction E. Using a resilient restorative effect of the cutting teeth 12, the cutting-teeth 12 cut into the outer circumference 14 of the tube line 6 in a manner dependent on the material of the tube line 6 and the geometry of the cutting surfaces 16. In FIG. 5b it is depicted that the support surface 18 comes into abutting contact to the outer circumference 14 with the tube line 6 starting from a predetermined cutting-in depth depicted in FIG. 5a.

Figure 6A:
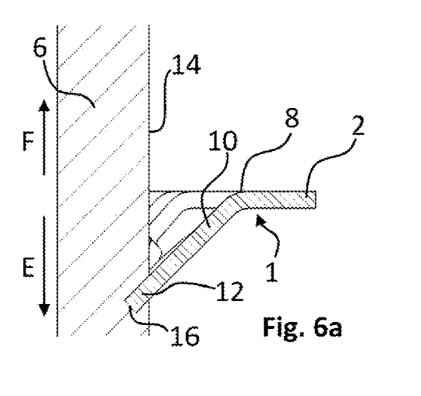
Figure 6B:
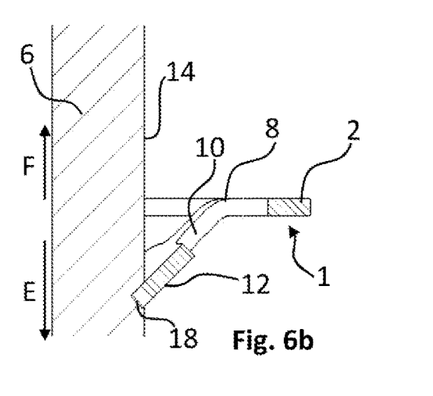

FIGS. 6a and 6b show a preferred embodiment, wherein via the first abutting contact of the support surface 18 on the outer circumference 14 of the tube line 6 the support surface 18 itself, in addition to the cutting surface 16, cuts into the outer circumference 14 of the tube line 6, and supportively fixes the tube line 6 axially with respect to the toothed washer central axis X.

In the embodiments of the toothed washer 1 depicted in FIGS. 1 and 7, the cutting surfaces 16 of the cutting teeth 12 advantageously each have a cutting upper surface, and the support surfaces 18 of the cutting teeth 12 each have a support upper surface. Each cutting tooth 12 preferably has a ratio of a sum of the cutting upper surfaces of the cutting surfaces 16 to a sum of the support upper surfaces of the support surfaces 18 that falls in a range from 0.8 to 1.2, in particular 0.9 to 1.1, or preferably corresponds to 1.

The cutting surface is respectively calculated per cutting tooth 12 in particular from a cutting width S, see FIG. 1, which corresponds to the length of the cutting surfaces 16 perpendicular to the toothed washer central axis X, multiplied by the cutting thickness D1, see FIG. 2, which corresponds to the axial extension of the cutting surfaces 16 with respect to the toothed washer central axis X in the region of the cutting surfaces 16. The support surface is respectively calculated per cutting tooth 12 in particular from a support width B, which corresponds to the length of the support surfaces 18 perpendicular to the toothed washer central axis X, multiplied by the support thickness D2, which corresponds to the axial extension with respect to the toothed washer central axis X in the region of the support surfaces 18.

For the definition of the cutting thickness D1 and the support thickness D2, the axial extension relative to the toothed washer central axis X refers to an undeformed state of the toothed washer 1. In the undeformed state the cutting teeth 12 are preferably aligned flush completely together with the annular base 2 and the resilient hinge sections 8 in a plane perpendicular to the toothed washer central axis X. In particular, the cutting thickness D1 and the support thickness D2 are maintained after the shaping process.

In particular when the cutting surfaces 16 and/or the support surfaces 18 are each configured as pitch-circle segments 20 bent about a center point, corresponding to the embodiment depicted in FIG. 1, and preferably the center points are each oriented with respect to the toothed washer central axis X, wherein in particular the center points of the pitch-circle segments 20, preferably in the undeformed state, lie in the toothed washer central axis X, the arc length of the cutting surface 16 about the respective pitch-circle segment center point is advantageously used for the cutting width S. Accordingly, in particular the arc length of the support surface 18 about the respective pitch-circle segment center point is used for the support width B of the support surface 18.

In accordance with the toothed washer 1 according to FIG. 1, the cutting surfaces 16 of the toothed washer 1 according to the embodiment depicted in FIGS. 7 and 8 advantageously each have the cutting thickness D1, see FIG. 8, which corresponds to the axial extension of the cutting surfaces 16 with respect to the toothed washer central axis X in the region of the cutting surfaces 16, and the support surfaces 18 each have in particular the support thickness D2 depicted in FIG. 8, which corresponds to the axial extension in the region of the support surfaces 18. Unlike the embodiment depicted in FIG. 1, in the embodiment depicted in FIG. 7, the support thickness D2 of the support surface 18 is preferably at least partially greater than the cutting thickness D1 of the cutting surface 16. This embodiment is recognizable in particular in FIG. 8, wherein FIG. 8 depicts a particularly preferred embodiment, according to which the support thickness D2 of the support surface 18 is in particular at least in part twice as large as the cutting thickness D1 of the cutting surface 16. FIGS. 8 and 7 show here that the enlarged support thickness D2 can be generated during the manufacturing process of the toothed washer 1 by simple flipping or folding of a tongue connected to the cutting tooth 12.

As already described, the installation sequence according to FIGS. 3a to 6b is transferable to the embodiment depicted in FIGS. 7 and 8, wherein due to the enlarged support surface 18 the limiting effect of the set-back support surface 18 in the cutting-in of the respective cutting tooth 12 is reinforced.

Figure 9A:
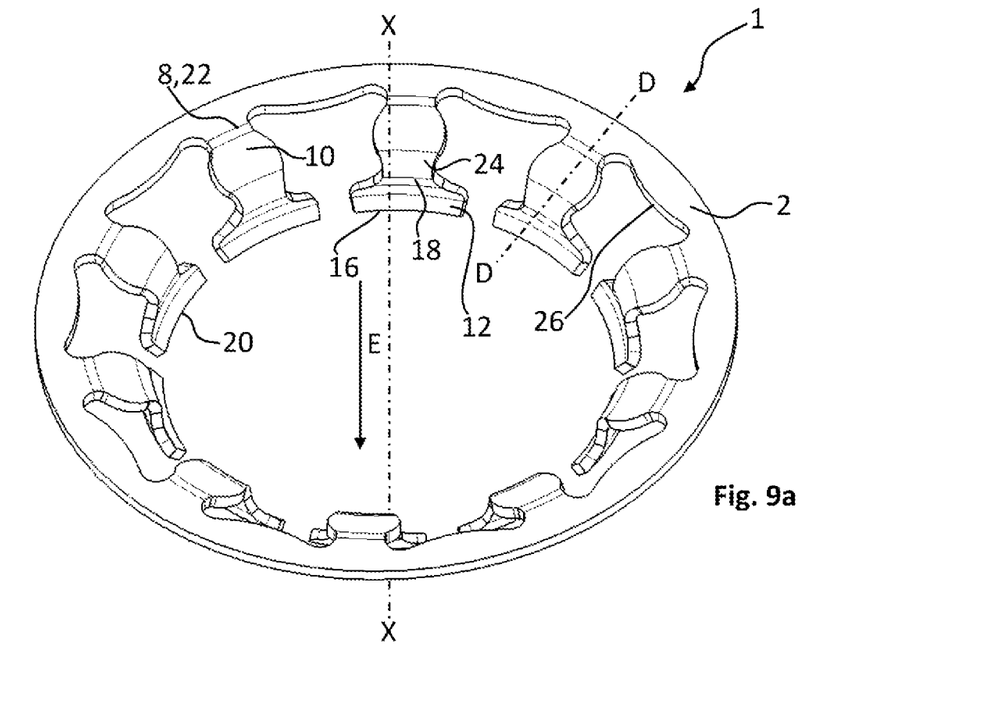
FIG. 9a shows a perspective view of a further inventive embodiment of a toothed washer 1.

Further alternative embodiments of the toothed washer 1 are depicted in FIGS. 9a to 14. Here the embodiment depicted in FIG. 9b differs by a reinforced supporting region 30, wherein at least the support surface 18 is disposed, and in the number of cutting teeth 12 from the embodiment depicted in FIG. 9a. These embodiments distinguish themselves, in contrast to the toothed washer 1 according to the embodiment depicted in FIG. 1 or 7, by a different arrangement of the support surface 18, wherein the embodiments shown in FIGS. 9 to 14 are additionally combinable with the above-mentioned embodiments according to FIGS. 1 to 8 and can be extended. For illustration, a section along D-D according to FIG. 9a is depicted in FIGS. 10 to 14, but the advantageous embodiments described below are transferable to the embodiment in FIG. 9b.

The number of cutting teeth is preferably adapted to the insertion behavior to be achieved. In accordance with the embodiment depicted in FIG. 9a, the toothed washer 1 can advantageously have ten cutting teeth 12 formed. According to a further advantageous embodiment, in accordance with the embodiment depicted in FIG. 9b, the toothed washer 1 can have eight cutting teeth 12 formed.

Figure 9B:
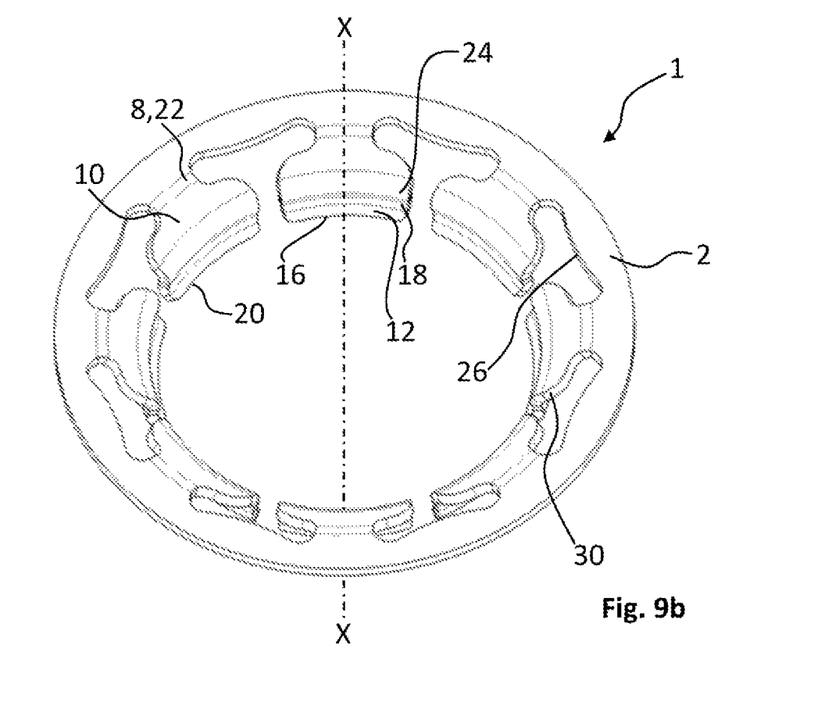
FIG. 9b shows a perspective view of a further inventive embodiment of a toothed washer 1.

In particular, in the embodiments depicted in FIGS. 9a, 9b and 10, the support surfaces 18 are respectively disposed between the cutting tooth 12 and the retaining section 10 as a single component with the cutting tooth 12 and the retaining section 10. The support surface 18 is preferably connected to the retaining section 10 by a first bending 22 disposed in the hinge section 8, and to the cutting tooth 12 by a second bending 24. The support surface 18 preferably includes a support angle β with the base 2 in a direction pointing away from the toothed washer central axis X. In particular, the support angle β is smaller a bending angle α, which the retaining section 10 includes with the base 2 in the direction pointing away from the toothed washer central axis X. Particularly preferably the cutting tooth 12 includes a cutting angle γ3 with the base 2 in the direction pointing away from the toothed washer central axis X. In particular, here the cutting angle γ3 is greater than the support angle β.

The support width B of the support surface 18, which is determined as described for FIGS. 1 to 8, can advantageously be configured smaller than the cutting width S of the cutting tooth 12, which is also determined as described for FIGS. 1 to 8. This embodiment is depicted in FIG. 9a. The support width B and the cutting width S are not depicted in FIGS. 9a and 9b. The reduced support width B has the advantage that the elasticity improves, and the force required for a deforming or displacing of the cutting tooth 12 is kept low. In particular, the installing of the tube line 6, in particular in the insertion direction E, is thereby simple as possible.

According to the embodiment depicted in FIG. 9b, the support surface 18 is advantageously disposed in a reinforced supporting region 30. The reinforced supporting region 30 is, in particular compared to the embodiment depicted in FIG. 9a, an enlargement of the support width B of the support surface 18. In particular, as depicted in FIG. 9b, the support width B of the support surface 18 corresponds to the cutting width S of the cutting tooth 12. The reinforced supporting region 30 particularly advantageously comprises the support surface 18, the second bending 24, and the retaining section at least partially. Here the reinforced supporting region 30 advantageously directly connects to the cutting tooth 12. The enlarged support width B increases the force required for a deforming or a displacing of the cutting tooth 12, and increases the supporting effect of the support surface 18. The reinforced supporting region 30 is particularly advantageous during the installing of tube lines 6 having a more resistant outer circumference 14. The reinforced support width B, in particular the reinforced second bending 24, increases the force of the resilient restorative effect of the cutting teeth 12 when they have been deformed or displaced by the tube line 6. The cutting teeth 12 thereby cut more easily into the outer circumference 14 of the tube line 6, and the risk of the tube line 6 slipping through is reduced.

The reinforced support width B has the advantage, synergetically with the easier cutting-in of the cutting teeth 12, that the supporting effect is increased, and the cutting-in depth of the cutting teeth 12 is sufficiently limited, even with an increased restorative effect, and in particular prevents a cutting-off of the tube line 6.

In this embodiment the design of the bending angle α establishes in particular a lever for the retaining section 10. Depending on the smallest spacing of the retaining section 10 radially with respect to the toothed washer central axis X, in particular the smallest spacing is at the center point of the bending angle α, as well as the bending angle α itself, a contact pressure is set between the support surface 18 and the outer circumference 14 of the tube line 6.

Figure 11:
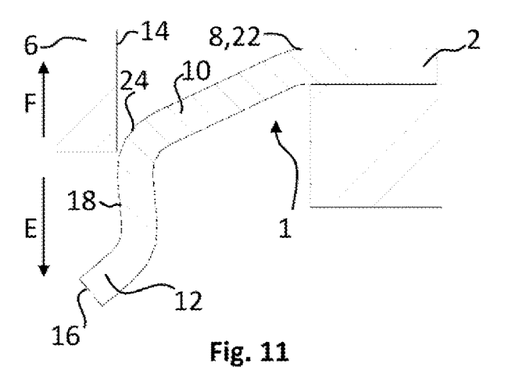

The bending angle α, see FIG. 10, is preferably chosen such that in a not-installed state, as depicted in FIG. 11, it falls in a range between less than/equal to 175° and greater than/equal to 135°, since starting from an angle greater than 175°, the cutting teeth 12 envelop axially with respect to the toothed washer central axis X during the fixing movement F of the tube line 6 to be installed, and would cut through the tube line 6. On the other hand, with a bending angle α smaller than 135°, the radial clamping force would be too small, and would result in a peeling-off of the tube line 6 to be installed. The bending angle α of the toothed washer 1 is in particular 90° to 180°.

In particular, the cutting angle γ3, see FIG. 10, in the not-installed state depicted in FIG. 11, is 120° to 150°, preferably 130° to 140°, which represents a particularly favorable angle ratio for a cutting-in of the cutting surfaces 16 into the outer circumference 14 of the tube line 6. In this state, depicted in FIG. 11, the cutting surfaces 16 of the cutting teeth 12 are disposed in an inner circular path that has a smaller diameter than the outer circumference 14 of the tube line 6 to be installed.

Figure 12:
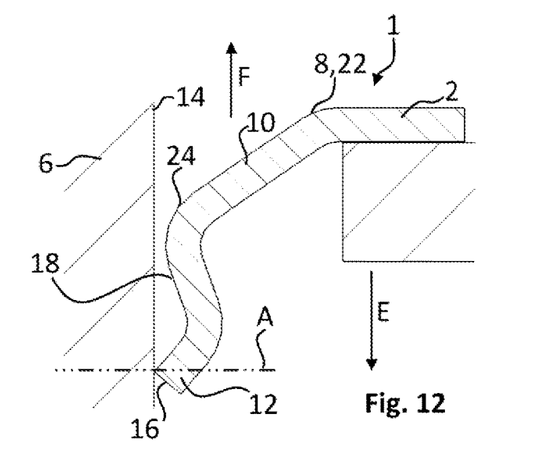

In FIG. 12 an installation step is depicted wherein the tube line 6 is passed along the cutting surfaces 16 in the insertion direction E, whereby the cutting teeth 12 have been pressed radially outward from the toothed washer central axis X, and the cutting angle γ3 has thereby decreased. Here it can be seen in particular that the cutting surfaces 16 abut against the outer circumference 14 of the tube line 6 at an angle.

Figure 13:
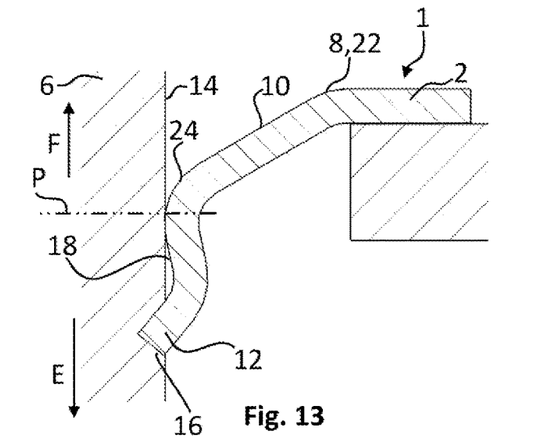

FIG. 13 shows the installation step following the installation step depicted in FIG. 12. In this installation step, with a fixing movement F the tube line 6 is moved from the state depicted in FIG. 12 against the insertion direction E with a fixing movement F. Using the resilient restorative effect of the cutting teeth 12, the cutting teeth 12 cut into the outer circumference 14 of the tube line 6 in a manner dependent on the material of the tube line 6 and the geometry of the cutting surfaces 16.

The toothed washer 1 preferably generates a friction-interference fit by the cutting-in of the cutting surfaces 16 into a cutting-in plane A in the outer circumference 14 of the tube line 6. Furthermore, due to the advantageous angling of the individual sections during the fixing movement F and the tendency arising here of the cutting tooth 12 to increase the cutting angle γ3, a contact pressure oriented radially to the toothed washer central axis X arises between the support surface 18 and the outer circumference 14 of the tube. This friction fit is effected in particular over the circumference of the outer tube evenly distributed in a press plane P oriented axially offset from the cutting-in plane A with respect to the toothed washer central axis X in the direction of the fixing movement F, and parallel to the cutting-in plane A.

Furthermore, due to such an embodiment, using the support surface 18 the cutting-in behavior is synergetically improved, since the cutting-in is limited in a to-be-fixed tube line 6 during the fixing movement F by the placing of the support surface 18 on the outer circumference 14 of the tube line 6, and simultaneously due to the deforming of the cutting tooth 12 during the fixing movement F, the support surface 18 is pressed radially against the outer circumference 14 and additionally secures the position of the tube line 6 relative to the toothed washer 1 with a friction fit.

In this respect the support angle β is chosen in particular such that, as depicted in FIG. 13, after a first slight cutting-in of the cutting surface 16 into the outer circumference 14 of the tube line 6, the support surface 18 is pressed radially against the outer circumference 14 of the tube line 6. For a tube line 6 having an outer diameter of 12 mm, the support angle β is preferably chosen such that the cutting-in depth required for a first abutment contact of the support surface 18 against the outer circumference 14 of the tube line 6 is in particular 0.3 mm.

Furthermore, the lengths of the retaining sections 10 as well as the bending angle α are preferably chosen such that the transition points 24 from the retaining sections 10 to the support surfaces 18 lie in the press plane P along a circular circumference whose diameter is preferably greater than the outer diameter of the tube line 6 to be installed. If the support surface 18 were to be applied against the tube line 6 before the cutting surface 16 has slightly cut into the outer circumference 14 of the tube line 6, this could cause the cutting surfaces 16 to not cut into the outer circumference 14 of the tube line 6 due to a reduced restorative effect of the resilient cutting teeth 12, and a slipping-by of the tube line could thereby result. When the circular circumference of the support surfaces 18 in the press plane P is too large, it can happen that the advantageous effect of a radial supporting as well as of the cutting-in limit is not achieved, and the cutting teeth 12 cut into the tube line more deeply than desired.

Figure 14:
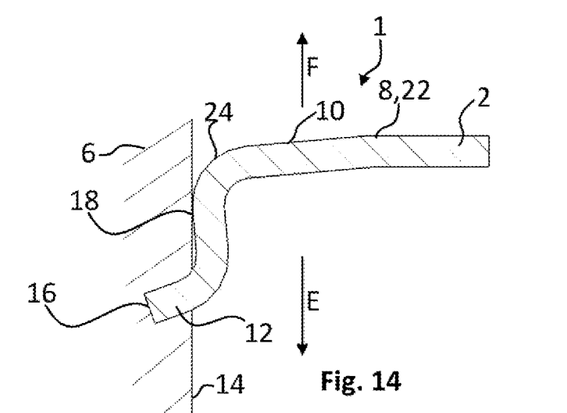

FIG. 14 shows a maximum pressure-load case of the tube line 6. The maximum pressure load of the tube line 6 lies shortly before a reaching a burst pressure, which results in a tube failure. Due to the tendency of the cutting tooth 12 to increase the cutting angle γ3 during cutting-in synergetically with the axial fixing movement F against the insertion direction E, the support surface 18 has been pressed-in radially in an abutting manner against the outer circumference 14 of the tube line 6 such that a further cutting-in of the cutting teeth 12 is greatly limited, and a cutting-off or tearing-off of the tube line is effectively prevented, even under maximum pressure load. Here the angular dimensions α, β, γ3 of the transitions from the retaining section 10 to the support surface 18, and from the support surface 18 to the cutting tooth 12, as well as the lengths of the retaining section, of the support surface 18, and of the cutting tooth 12 can advantageously be chosen such that with a predetermined cutting-in depth of the cutting surfaces 16, the support surface 18 applies the maximum radial contact force.

An advantageous embodiment is depicted in each of FIGS. 9a and 9b, according to which the annular base 2 respectively has rounded-off torsion reinforcements 26 formed between each two bending sections 8, whose peaks are oriented toward the toothed washer central axis X. In an advantageous manner the torsion reinforcements 26 prevent a rotating of the toothed washer 1 and thereby prevent that the cutting-in behavior changes due to a change of the geometry of the base 2 with an effect on the hinge sections 8, and/or the toothed washer 1 tilts, in particular in a fluid connector 4.

In FIG. 15 a fluid connector 4 for tube line installation is depicted. This fluid connector 4 is preferably used for the installing of fluid-guiding tube lines 6. As depicted, the fluid connector 4 has a receptacle section for introducing a tube line 6 in an insertion direction, as well as a retaining element disposed in the receptacle section 28.

According to the invention the retaining element is configured as a toothed washer 1 according to an embodiment of the above-mentioned type, in particular according to an embodiment depicted in FIGS. 1 to 14.

The invention is not limited to the exemplary embodiments shown and described, but rather also comprises all embodiments which work the same way in the sense of the invention. It is emphasized that the exemplary embodiments are not limited to all features in combination, rather each individual partial feature can also have inventive significance in isolation from all other partial features. Furthermore, the invention is so far not yet limited to the combinations of features defined in claim 1, but rather can also be defined by any other combination of specific features of all of the individual features disclosed. This means that in principle practically any individual feature of claim 1 can be removed or replaced by another individual feature disclosed elsewhere in the application.

The invention claimed is:

1. Toothed washer, in particular for fixing a tube line introduced in a fluid connector in an insertion direction, comprising:
    an annular base having a toothed washer central axis, wherein at the inner circumference of the base, cutting teeth are respectively disposed as a single component on the base radially inward and obliquely to the toothed washer central axis and extending in the insertion direction over an overmolded resilient hinge section and an overmolded retaining section connected thereto, wherein the cutting teeth are configured such that in the event of a fixing movement of the tube line, the cutting teeth cut-in against the insertion direction into an outer circumference of the tube line, wherein the cutting teeth include a cutting surface for cutting into the outer circumference of the tube line to be fixed,
    wherein the cutting teeth have a support surface, and the support surface is configured set back radially outward as viewed from the cutting surface, so that the cutting-in of the respective cutting tooth is limited during a placing of the support surface onto the outer circumference of the tube line; and
    wherein the annular base has rounded-off torsion reinforcements between each two hinge sections, the peaks of which torsion reinforcements are oriented toward the toothed washer central axis.

2. A toothed washer according to claim 1,
    wherein the cutting surfaces and/or the support surfaces are each configured as pitch-circle segments bent about a center point, wherein the center points are each oriented with respect to the toothed washer central axis.

3. The toothed washer according to claim 2, wherein that the center points of the pitch-circle segments lie in the toothed washer central axis.

4. The toothed washer according to claim 2, wherein, in an undeformed state, the center points of the pitch-circle segments lie in the toothed washer central axis.

5. The toothed washer according to claim 1,
wherein the cutting teeth each include at least two teeth on which the cutting surface is formed, wherein the support surface respectively formed between the teeth, wherein the cutting surfaces are configured flush with the support surfaces.

6. The toothed washer according to claim 1,
wherein the cutting surfaces of the cutting teeth each have a cutting upper surface, and the support surfaces of the cutting teeth each have a support upper surface, wherein each cutting tooth has a ratio of a sum of the cutting upper surfaces of the cutting surfaces to a sum of the support upper surfaces of the support surfaces, which lies in a range of 0.8 to 1.2.

7. The toothed washer according to claim 1,
wherein the cutting surfaces each have a cutting thickness that corresponds to the axial extension of the cutting surfaces with respect to the toothed washer central axis in the region of the cutting surfaces, and the support surfaces each have a support thickness, which corresponds to the axial extension in the region of the support surfaces, wherein the support thickness of the support surface is at least in part greater than the cutting thickness of the cutting surface.

8. The toothed washer according to claim 7,
wherein the support thickness of the support surface is at least in part twice as large as the cutting thickness of the cutting surface.

9. The toothed washer according to claim 1,
wherein the support surface is respectively disposed between the cutting tooth and the retaining section as a single component with the cutting tooth and the retaining section, wherein the support surface is connected to the retaining section by a first bending in the hinge section, and by a second bending to the cutting tooth.

10. The toothed washer according to claim 1,
wherein the support surface is disposed in a reinforced supporting region (30), wherein a support width of the support surface at least in the area of the reinforced supporting region corresponds to a cutting width of the cutting tooth.

11. A fluid connector for tube line installation including a receptacle section for introducing a tube line in an insertion direction, as well as a retaining element disposed in the receptacle section,
the retaining element being configured as a toothed washer having the features according to claim 1.

12. The toothed washer according to claim 1, wherein the cutting surfaces of the cutting teeth each have a cutting upper surface, and the support surfaces of the cutting teeth each have a support upper surface, wherein each cutting tooth has a ratio of a sum of the cutting upper surfaces of the cutting surfaces to a sum of the support upper surfaces of the support surfaces, which lies in a range of 0.9 to 1.1.

13. The toothed washer according to claim 1, wherein the cutting surfaces of the cutting teeth each have a cutting upper surface, and the support surfaces of the cutting teeth each have a support upper surface, wherein each cutting tooth has a ratio of a sum of the cutting upper surfaces of the cutting surfaces to a sum of the support upper surfaces of the support surfaces corresponding to 1.

14. A fluid connector for a fluid guiding tube line installation including a receptacle section for introducing a tube line in an insertion direction, as well as a retaining element disposed in the receptacle section, the retaining element being configured as a toothed washer having the features according to claim 1.

15. Toothed washer, in particular for fixing a tube line introduced in a fluid connector in an insertion direction, comprising:
an annular base having a toothed washer central axis, wherein at the inner circumference of the base, cutting teeth are respectively disposed as a single component on the base radially inward and obliquely to the toothed washer central axis and extending in the insertion direction over an overmolded resilient hinge section and an overmolded retaining section connected thereto, wherein the cutting teeth are configured such that in the event of a fixing movement of the tube line, the cutting teeth cut-in against the insertion direction into an outer circumference of the tube line, wherein the cutting teeth include a cutting surface for cutting into the outer circumference of the tube line to be fixed,
wherein the cutting teeth have a support surface, and the support surface is configured set back radially outward as viewed from the cutting surface, so that the cutting-in of the respective cutting tooth is limited during a placing of the support surface onto the outer circumference of the tube line
wherein the support surface is respectively disposed between the cutting tooth and the retaining section as a single component with the cutting tooth and the retaining section, wherein the support surface is connected to the retaining section by a first bending in the hinge section, and by a second bending to the cutting tooth; and
wherein the base extends in an outward direction relative to the toothed washer central axis, and the support surface includes a support angle with the base in a direction pointing away from the toothed washer central axis, which support angle is smaller than a bending angle that the retaining section includes with the base in the direction pointing away from the toothed washer central axis.

16. The toothed washer according to claim 15,
wherein the cutting tooth includes a cutting angle with the base in the direction pointing away from the toothed washer central axis, wherein the cutting angle is greater than the support angle.

17. The toothed washer according to claim 15, wherein the bending angle in a non-assembled state is in the range of 135° to 175°, inclusive.

* * * * *